United States Patent [19]

Oreck et al.

[11] Patent Number: 4,970,762
[45] Date of Patent: Nov. 20, 1990

[54] ARTICLE SECURING DEVICE

[75] Inventors: Adam Oreck, Minneapolis; Ronald K. Westby, Ramsey, both of Minn.

[73] Assignee: Uni-Clip Corporation, Minneapolis, Minn.

[21] Appl. No.: 499,199

[22] Filed: Mar. 23, 1990

Related U.S. Application Data

[63] Continuation of Ser. No. 319,614, Mar. 6, 1989, abandoned.

[51] Int. Cl.⁵ ............................................. A44B 11/25
[52] U.S. Cl. ..................................... 24/625; 70/456 R
[58] Field of Search ............................ 70/456 R, 457; 24/230.5 W, 625, 3 K, 614, 615, 265 AL, 265 R, 618

[56] References Cited

U.S. PATENT DOCUMENTS

| 362,548 | 5/1987 | Smith . | |
|---|---|---|---|
| 1,300,609 | 1/1919 | Heinkel . | |
| 2,401,975 | 6/1946 | Simpson . | |
| 2,405,400 | 8/1946 | Butterfield . | |
| 2,549,459 | 6/1949 | Guest . | |
| 3,126,729 | 3/1964 | Leopoldi | 24/615 X |
| 4,408,375 | 10/1983 | Skobel . | |
| 4,534,090 | 8/1985 | Skobel | 24/625 |
| 4,651,390 | 3/1987 | Skobel | 24/625 |
| 4,793,032 | 12/1988 | Crowle | 24/625 X |

FOREIGN PATENT DOCUMENTS

| 438533 | 5/1912 | France | 24/625 |
|---|---|---|---|
| 2445704 | 9/1980 | France | 70/456 R |
| 3738 | 1/1916 | United Kingdom | 24/625 |

*Primary Examiner*—James R. Brittain
*Attorney, Agent, or Firm*—Steven E. Kahm

[57] ABSTRACT

An article securing device consisting of two parts, a block with a hole in it and an article holding portion having two arms which can be inserted into and locked onto the block. The arms have notches on their ends for engaging the block and locking the article holding portion thereon. The article holding portion has an oblong shaped looped portion. When one said of the oblong loop portion is squeezed one arm rides up on and is depressed into a depression on the other arm, unlocking the arms from the block and allowing th earticle holding portion to be withdrawn from the block for inserting articles on the article holding portion.

14 Claims, 4 Drawing Sheets

ARTICLE SECURING DEVICE

This is a continuation of application Ser. No. 07/319614, filed Mar. 6, 1989, abandoned.

In one embodiment, the invention can be used as a key ring, inserting a key on the article holding portion and attaching the article holding portion to a block.

There are many key rings on the market of varying styles and ease of use. The way that the key ring locks in place so that the keys remain on the ring is one of the variables in the designs of key rings. A good key ring allows the user to easily add or remove keys from the ring. This ease of use is a desirable function. To be marketable the key ring design should be as simple as possible to keep costs down. The more parts there are the more complex the design, and the higher the cost.

One of the most popular designs in the key ring industry is the split ring which is frequently attached to a plastic holder of some kind. The one drawback in using the split ring key holder is that it is frequently difficult to add or take off a key in that the ring must be separated enough for the hole in the head of the key to be slid into the slit in the key ring.

The challenge in this field of art is to come up with a low cost, easy to make, easy to use design.

In other embodiments any article can be secured by using the article holding portion to secure an object to a block or other object designed to work in conjunction with the article holding device.

For instance a rope, wire or cable can be passed between the arms of the article holding portion which can be inserted into a block or other receiving device. The invention can thus be used for holding a wire in place when wiring a building. It can also be used to hold articles firmly in place such as a rope used as a tie down. Many other uses are possible for the invention.

SUMMARY OF THE INVENTION

The invention is for an improved article securing device which is simple to manufacture and has an easy to use locking system which allows the user to quickly and easily lock or release it. This makes it easy to place an article on the device. It also makes it easy to secure or release the article from a block.

The invention has two parts a block having a hole in it and an article holding portion having a loop portion with two arms. When the arms are placed through the hole in the block they lock the article holding portion to the block.

The loop portion holds the article held, such as keys. The arms can be easily pulled apart to add or remove keys or other articles from the ring. The arms have a notch on the end which is used to lock the article holding portion onto the end of the block. The loop portion can be deformed to make one arm longer relative to the other arm which acts to unlock the article holding portion. One arm has a depressed portion near its end for the tip of the other arm to slide into. In this way the notch is removed from its locking position and the arms can be withdrawn from the block.

DETAILED DESCRIPTION

Figure 1:
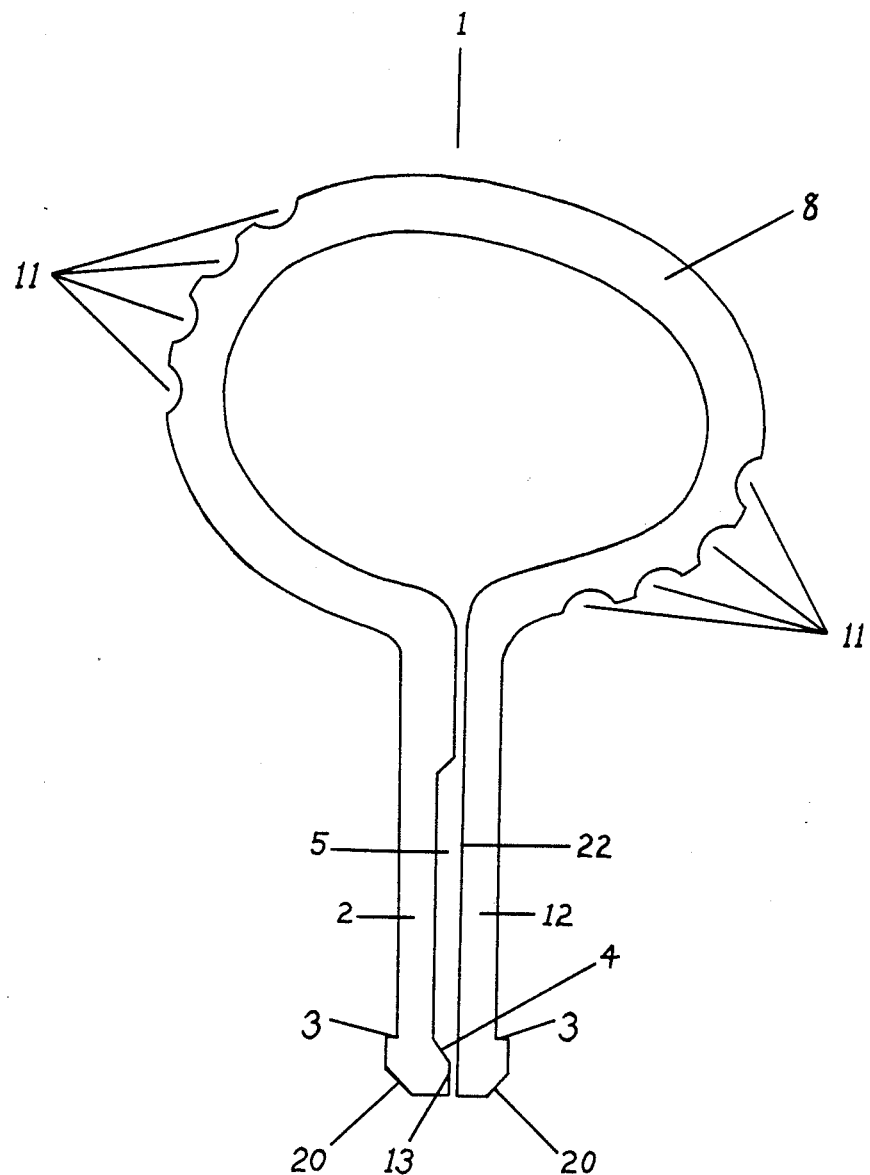
FIG. 1 is a side view of the article holding portion.
Figure 2:
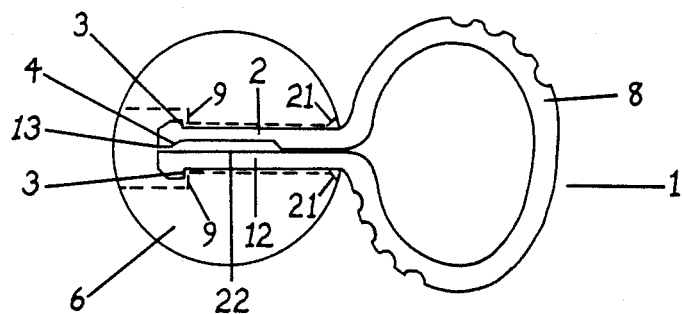
FIG. 2 is a side cut a way view of the block with the article holding portion in its locked position.
Figure 3:
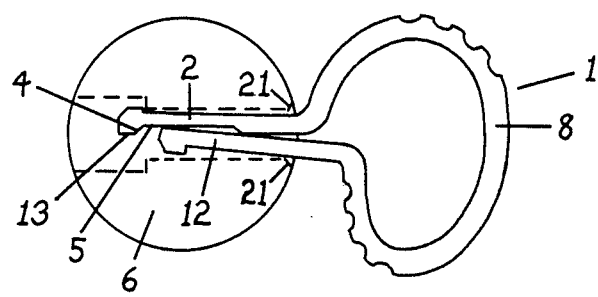
FIG. 3 is a side cut a way view of the block with the article holding portion being moved through the hole in the block.
Figure 4:
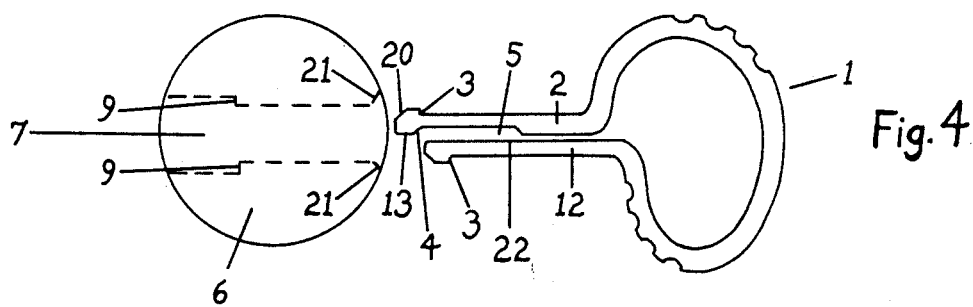
FIG. 4 is a side cut a way view of the block with the article portion out of the block.
Figure 5:
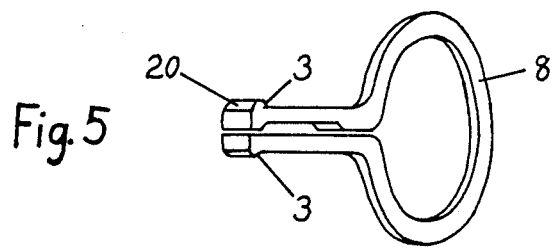
FIG. 5 is a perspective view of the article holding portion.

Referring to the drawings, FIG. 1 shows a side view of the article holding portion 1, and all of its parts in detail. FIGS. 2, 3 and 4 illustrate how the invention functions. FIG. 2 shows a cut a way side view of the block 6, with the arms 2 and 12, of the article holding portion 1, inserted in the hole 7, of the block. Each of the arms 2 and 12, have notches 3, which engage ridge 9 and lock the article holding portion 1, to the block 6. The ridges 9, preferably are perpendicular to the hole 7, and provide a plateau for the notches 3 on the arms 2 and 12 to engage and lock the article holding portion 1 to the block 6.

The locking and unlocking of the key ring is accomplished by arm 2 having a depressed portion 5, cut in its side. When the oblong shaped loop portion 8, is distorted by the user pressing on the finger grip ridges 11, arm 12, is drawn upward relative to arm 2. This allows arm 12, to slide downward on the sliding portion 4, of arm 2. Arm 12, is depressed into the depressed portion 5, of arm 2, thus removing notch 3, from ridge 9. The article holding portion 1, can thus be removed from block 6.

The length of the arms 2 and 12 should be long enough compared to the hole in the block 7, such that when the loop portion 8 is distorted there is room for arm 2 to be pushed downward compared to arm 12 and the notch 3 on arm 12 clears ridge 9 on the block. Arm 12 can thus be depressed into the depressed portion 5, on arm 2. The depressed portion 5 will allow the notch 3 on arm 12 to clear the ridge 9 in the block. In this manner the article holding portion 1, can be locked or unlocked from the block 6.

The arms must be distorted relative to one another far enough for the plateau 13 on arm 2 to be cleared by the tip of arm 12 to unlock the device. Similarly as long as the plateau 13 is touching the flat portion 22 of arm 12 the device will remain locked.

Figure 6:
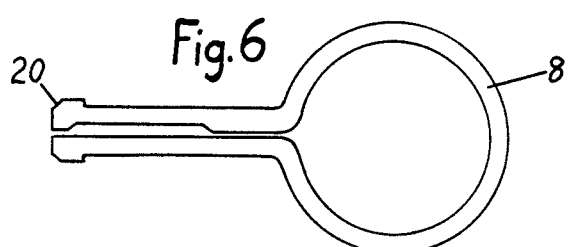
FIG. 6 is a side view of the article holding portion.
Figure 8:
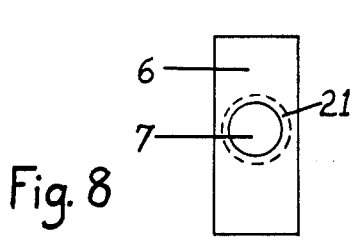
FIG. 8 is a top view of the block.
Figure 7:
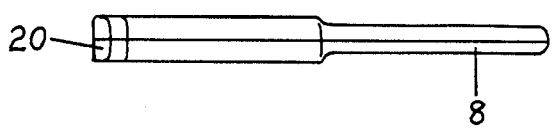
FIG. 7 is a top view of the article holding portion.

When inserting the article holding portion 1, onto block 6, see FIG. 6, the loop portion is distorted by placing pressure on the ridges 11, the arm 12 is thereby moved relative to arm 2. The angled portion 20 of the arms, 2 and 12 are depressed by the side walls of the block 6 which helps the user force the article holding portion into the hole in the block. Arm 12 is pressed into the depressed portion 5, on arm 2, until the arm 2 clears the ridge on block 9. Then the user can then release the loop portion 8, and the resiliency of the depressed loop returning to its normal shape will force arm 12, up sliding portion 4, locking notch 3, under ridge 9.

It is preferred to have a chamfer 21 on the top of the block to aid in inserting the article holding portion into the block. To this end it is preferred to have the angled portion 20 cut at approximately the same angle as the chamfer 21 on the block 6.

Figure 11:
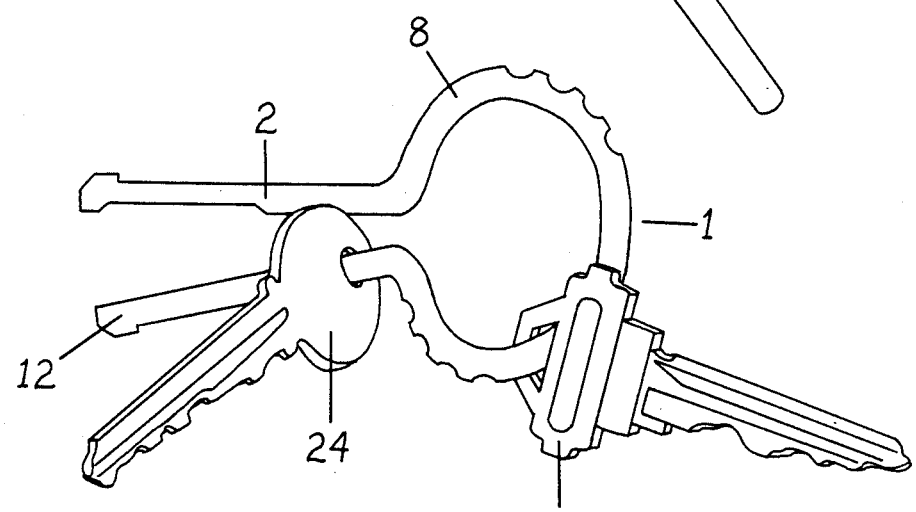
FIG. 11 is a side view of the article holding portion with it's arms spread for keys to be placed on the article holding portion.

As shown in FIG. 11 when the article holding portion 1 is out of the block 6, keys or other objects may be easily added or withdrawn by spreading the arms 2 and 12.

The article holding portion 8, should be make of an elastic resilient pliable plastic material to allow deforming the loop portion 8 without breaking it over many locking and unlocking operations.

To help the user squeeze the loop portion 8, part of the article holding portion 1, in the proper places, ridges 11, are preferably used to indicate the place to apply force to unlock the article holding device and to allow the user a better grip for doing so.

As shown in FIG. 6 the loop portion 8, does not have to be oblong. It can be round or any other shape. Although an oblong loop shape seems to function well any shape which can be distorted to move the arms 2 and 12 relative to one another will work.

Figure 10:
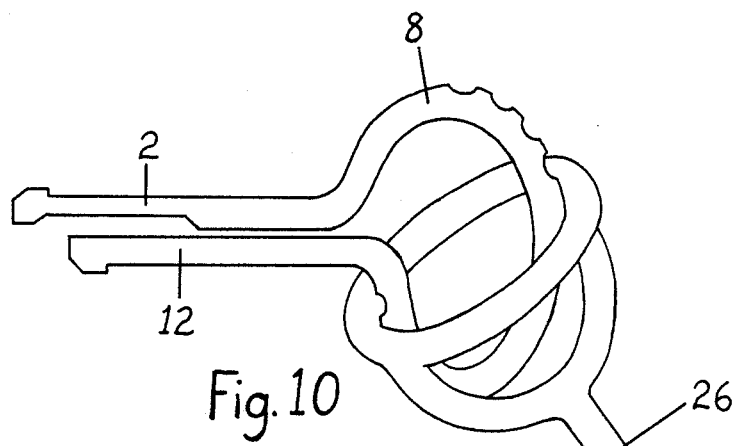
FIG. 10 shows the invention being used with a leverage key which is to help lock and unlock it.

The invention can be made of stronger materials for the ability of the invention to hold thousands of pounds of force when in its locked position. If the article holding portion is to hold such forces it would be necessary to use a tool such as leverage device 26, as shown in FIG. 10, to distort the loop portion 8.

Figure 9:
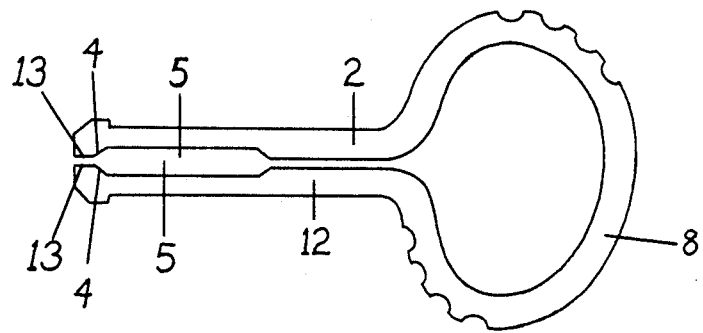
FIG. 9 is a side view of a second embodiment of the invention where each arm has a depressed portion.

In another embodiment of the invention as shown in figure 9, both arms 2 and 12 have depressed portions 5. Thus either arm may be depressed relative to the other to allow the plateau 13 to slide down the sliding portion 4, into the depressed portion 5 to unlock the device. Conversely as long as the loop portion 8 is not deformed the plateaus 13 will be opposite one another and prevent the notches 3 from disengaging from the ridges 9.

Figure 12:
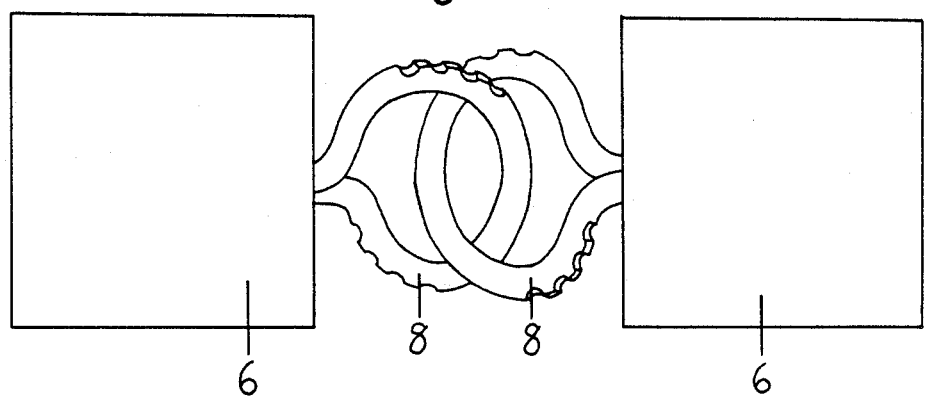
FIG. 12 is a side view of the invention being used to secure two blocks to one another.
Figure 13:
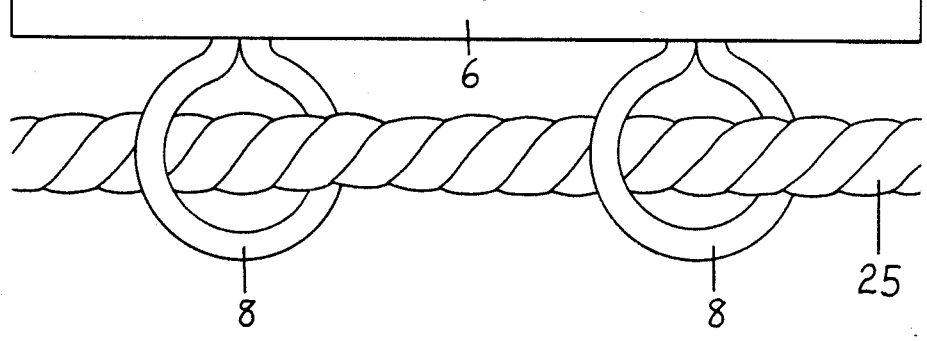
FIG. 13 is a side view of the invention used to hold a length of rope.

There are many uses envisioned for the article securing device. It can be used as a cotter pin. It can be used as a pivotable connector to attach one article pivotably to another. It can be used with wires to hold the wires 25, in place when stringing wire as shown in FIG. 13. It can be used to attach two articles to one another as shown in FIG. 12. It can be used as an anchoring device to secure a cable 23, holding a large weight as shown in FIG. 14.

Figure 14:
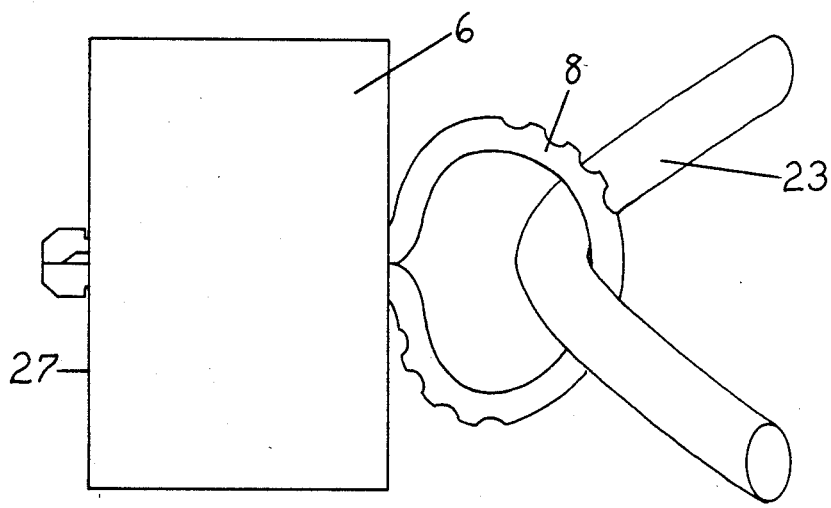
FIG. 14 is a side view of the invention used to anchor a tie down.

FIG. 14 shows as one embodiment the surface 27 of the block 6 acting as the ridge 9.

The uses for a device which can be easily released but can hold large forces are almost unlimited. The inventors do not restrict the use of their article securing device to the uses shown herein.

I claim:

1. An article securing device comprising,
an article holding portion and a block,
the block having a hole with a radius and a ridge in the hole,
the article holding portion having a deformable flexible looped portion, a first arm and a second arm,
the first arm and second arm, each having a length and a width, extending from opposite ends to the looped portion to respective tips and extending parallel and slideably adjacent to each other for equal lengths, the looped portion and the arms being coplanar,
the length of the arms being longer than the hole in the block,
the width of the first arm plus the width of the second arm being almost the diameter of the hole in the block but allowing the arm to pass through the hole,
the first arm having a flat portion running the length of the arm facing the second arm and having a notch at the tip of the arm which extends outward on the opposing side from the flat surface,
the second arm being symmetric with the first arm, having a notch extending radially opposite the notch on the first arm and differing from the first arm by having a depressed portion, facing the flat portion of the first arm, extending from the notch near the tip of the second arm, said depression extending a portion of the arm's length,
the notches on the arm giving the arms a radius greater than that of the hole and thereby engaging the ridge, in the hole, to lock the article holding portion to the block, the arms being in contact with each other when the article holding portion is locked on the block preventing the article holding portion from disengaging from the block,
the deformable looped portion when deformed draws the first arm toward the loop and into the depression of the second arm, thereby removing the notch on the first arm from engaging contact with the ridge and unlocking the article holding portion from the block.

2. An article securing device as in claim 1 wherein the second arm has an angled sliding portion leading from the tip into the depressed portion to facilitate the first arm sliding into the depressed portion of the second arm, 3. An article securing device as in claim 2 where the arms have angled portions to allow the arms to be more easily inserted into the hole in the block.

4. An article securing device as in claim 3 where the block has a chamfer on one end of the hole to allow the arms to be more easily inserted into the block.

5. An article securing device as in claim 4 where a lever is attached to the looped portion to aid in deforming the looped portion.

6. An article securing device as in claim 1 where the looped portion is oblong.

7. An article securing device as in claim 1 where the looped portion is circular.

8. An article securing device as in claim 1 where both the first arm and the second arm have depressed portions.

9. An article securing device as in claim 8 where the first arm and the second arm have angled sliding portions leading from the tip into the depressed portion to facilitate the opposing arm sliding into the depressed portion.

10. An article securing device as in claim 9 where the arms have angled portions to allow the arms to be more easily inserted into the hole in the block.

11. An article securing device as in claim 10 where the block has a chamfer on one end of the hole to allow the arms to be more easily inserted into the block.

12. An article securing device as in claim 11 where a lever is attached to the looped portion to aid in deforming the looped portion.

13. An article securing device as in claim 8 where the looped portion is oblong.

14. An article securing device as in claim 8 where the looped portion is circular.

* * * * *